(12) United States Patent
Jang

(10) Patent No.: US 9,037,780 B2
(45) Date of Patent: May 19, 2015

(54) PLC DATA LOG MODULE WITH EXTERNAL STORAGE FOR STORING PLC LOG DATA AND METHOD FOR STORING PLC LOG DATA IN THE SAME

(75) Inventor: Hyun Woo Jang, Cheonan-si (KR)

(73) Assignee: LSIS Co., Ltd., Anyang-Si, Gyeonggi-Do (KR)

( * ) Notice: Subject to any disclaimer, the term of this patent is extended or adjusted under 35 U.S.C. 154(b) by 390 days.

(21) Appl. No.: 13/425,276

(22) Filed: Mar. 20, 2012

(65) Prior Publication Data

US 2012/0254517 A1 Oct. 4, 2012

(30) Foreign Application Priority Data

Apr. 1, 2011 (KR) .................. 10-2011-0030206

(51) Int. Cl.
| | | |
|---|---|---|
| G06F 13/00 | (2006.01) | |
| G05B 19/05 | (2006.01) | |
| G06F 11/20 | (2006.01) | |
| G06F 13/38 | (2006.01) | |
| G06F 12/02 | (2006.01) | |

(52) U.S. Cl.
CPC ............ *G05B 19/05* (2013.01); *G06F 11/2071* (2013.01); *G06F 13/382* (2013.01); *G06F 12/0246* (2013.01); *G06F 11/2089* (2013.01); *G06F 13/38* (2013.01); *G05B 2219/15064* (2013.01); *G05B 2219/15066* (2013.01)

(58) Field of Classification Search
CPC . G06F 12/0246; G06F 13/38; G06F 11/2071; G06F 11/2089; G06F 13/382; G05B 19/05; G05B 2219/15064; G05B 2219/15066

USPC ............... 711/103, 161; 710/13, 300, 52, 313
See application file for complete search history.

(56) References Cited

U.S. PATENT DOCUMENTS

| | | | |
|---|---|---|---|
| 2005/0097263 A1* | 5/2005 | Wurzburg | 711/103 |
| 2007/0186040 A1* | 8/2007 | Kasahara et al. | 711/115 |
| 2008/0074299 A1* | 3/2008 | Chang et al. | 341/118 |
| 2008/0215802 A1* | 9/2008 | Chow et al. | 711/103 |
| 2009/0132752 A1* | 5/2009 | Poo et al. | 711/103 |
| 2011/0209032 A1* | 8/2011 | Choi et al. | 714/773 |
| 2011/0289260 A1* | 11/2011 | Wang et al. | 711/103 |

FOREIGN PATENT DOCUMENTS

| | | |
|---|---|---|
| CN | 1581113 | 2/2005 |
| CN | 1742243 | 3/2006 |
| CN | 101059695 | 10/2007 |
| CN | 101556551 | 10/2009 |
| JP | 11-143784 | 5/1999 |
| KR | 10-2009-0018438 | 2/2009 |

OTHER PUBLICATIONS

The State Intellectual Property Office of the People's Republic of China Application Serial No. 201210091414.0, Office Action dated Feb. 25, 2014, 6 pages.

* cited by examiner

*Primary Examiner* — Hong Kim
(74) *Attorney, Agent, or Firm* — Lee, Hong, Degerman, Kang & Waimey

(57) ABSTRACT

Provided is a PLC data log module and method for storing data in the same, wherein, in a case one or more storages among a plurality of outside storages is attached, a log data is stored in the attached outside storage, the log data is stored in the storage and check is made as to whether the log data is normally stored in the attached outside storage.

11 Claims, 5 Drawing Sheets

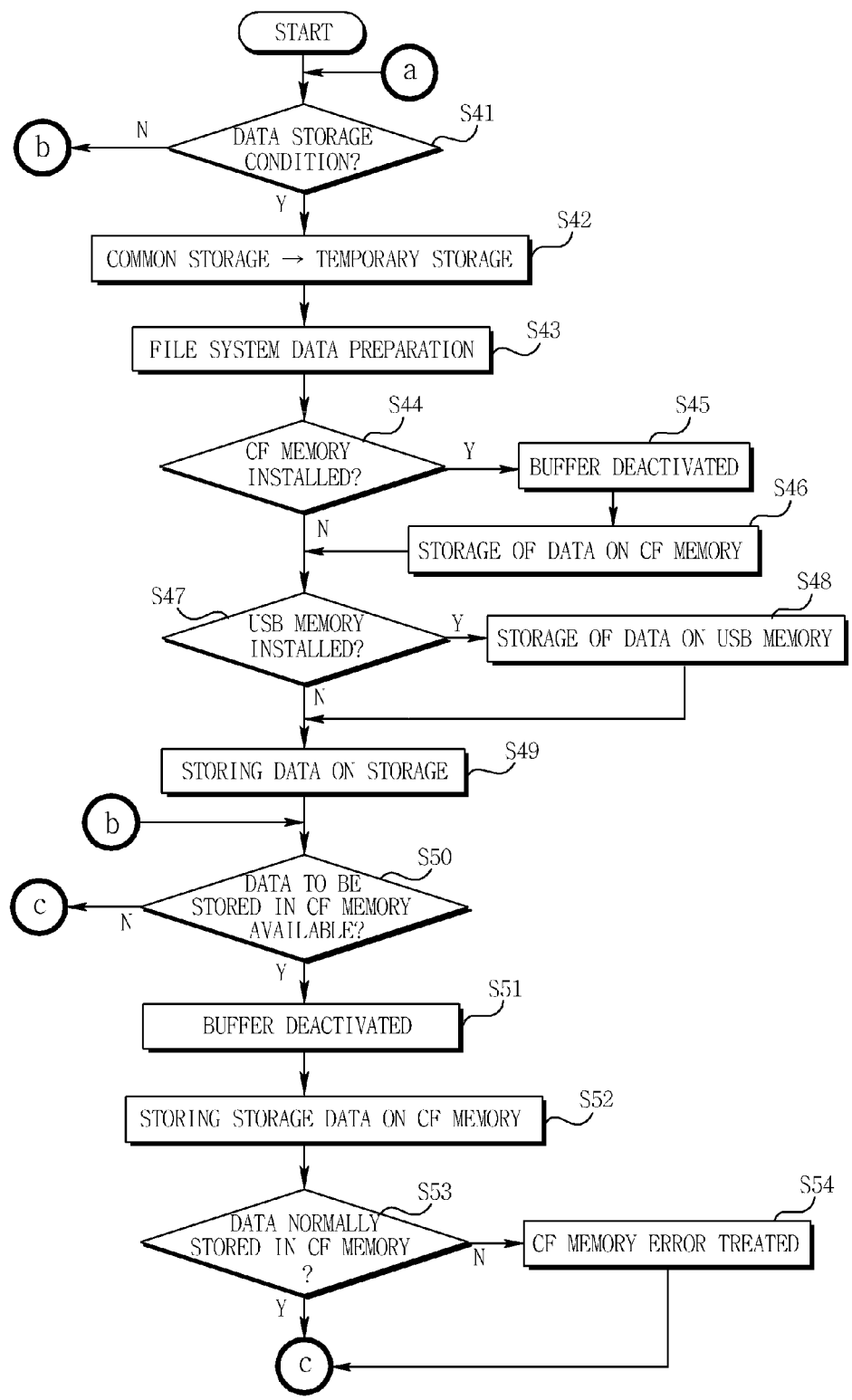

PLC DATA LOG MODULE WITH EXTERNAL STORAGE FOR STORING PLC LOG DATA AND METHOD FOR STORING PLC LOG DATA IN THE SAME

CROSS REFERENCE TO RELATED APPLICATIONS

Pursuant to 35 U.S.C. §119 (a), this application claims the benefit of earlier filing date and right of priority to Korean Patent Application No. 10-2011-0030206, filed on Apr. 1, 2011, the contents of which is hereby incorporated by reference in their entirety.

BACKGROUND OF THE DISCLOSURE

1. Field of Endeavor

The present disclosure relates to a data storing method, and more particularly to a data log module which is PLC (Programmable Logic Controller) expansion module and a method for storing data in the PLC data log module.

2. Background

Automation facilities at a traditional industrial site include mechanical devices such as a relay and the like. There is a difficulty in replacing wirings, each at a time, of an inner circuit in the automation facilities in order to change functions of the automation facilities configured with mechanical devices.

To solve the difficulties, a programmable logic controller (PLC) is typically employed. The PLC generally includes a basic module and a wide variety of expansion modules.

The PLC is largely controlled in an unmanned manner, and therefore, ex post facto measures must be taken to solve an abnormal operation if it is generated. A series of operations may be monitored or a log data of past history may be stored to check if and how the abnormal operation has been generated. As a large capacity of storage to check the abnormal operation, a CF (Compact Flash) memory or a USB (Universal Serial Bus) memory may be used to store the log data in 'FAT32' file system developed by Microsoft Corporation, Redmond, Wash. USA. FAT32 data is simple and fast in processing speed to be widely employed as file systems for industrial control devices. The stored FAT32 data may be stored in a removal storage device such as the CF memory or the USB memory, which is then removed from a data log module of PLC and the data stored in the FAT32 may be read out and analyzed using a personal computer or a data display device.

Recently, the USB memory and CF memory increases in usage, and are widely used as storage media because of large capacity and fast storage time. Although the USB memory and CF memory are easy in attachment and detachment, the abnormal operation of PLC cannot be detected by a data log module-removed state, and data cannot be disadvantageously stored.

FIG. 1 is a block diagram illustrating a data log module according to prior art.

Referring to FIG. 1, a data log module 100 according to the prior art is connected to a PLC basic module 200 and a power module 300, where the PLC basic module 200 reads out a parameter set up at the data log module 100 and transmits a relevant device data of the basic module 200 to the data log module 100. The power module 300 supplies a power required for operation of data log module 100.

A MPU (Micro Processor Unit, 110) performs an overall control of the data log module 100, and a RAM (Random Access Memory, 120) temporarily stores data of the basic module 200 read out by a common RAM 140. A display unit 130 displays an operation state of the data log module 100. The common RAM 140, a dual-port RAM commonly using read/write with the basic module 200, performs an interface with the basic module 200. A buffer 150 divides a CF memory 160 and an inner data bus, where $\overline{CD}$ is a signal for checking whether CF memory 160 is attached, and $\overline{OE}$ is an enable signal of CF memory 160. The CF memory 160, as explained above, permanently stores a log data that needs preservation in an FAT32 file structure.

FIG. 2 is a flowchart of data storage method of data log module according to prior art.

Referring to FIG. 2, the data log module according to prior art checks if the CF memory 160 is attached S22, in a case data storage condition is generated S21. If the CF memory 160 is not attached, an error is generated S23 because there is no room for data storage. Meanwhile, in a case data storage condition is not generated S21, the data log module according to prior art checks if a removal condition for CF memory 160 is generated S27.

The CF memory 160 is configured with an attachment/detachment structure unlike the conventional memory, and cannot be directly connected to an inner data bus and can be connected to the inner data bus through the buffer 150.

In order to attach and detach the CF memory 160, a CF memory removal signal must be inputted into the data log module 100 before attachment or detachment of the CF memory 160. That is, in a case the CF memory removal signal is inputted, the data log module 100 deactivates the buffer S28, safely detach the inner data bus from the CF memory S29 and ends the data logging.

In S22, in a case the CF memory 160 is attached, data of the common RAM 140 is copied to the RAM 120 S24 and processed in a file system (FAT320) format S25. Successively, the data log module 100 checks if the CF memory removal condition is ON S27, keeps performing a data logging if it is determined that the CF memory removal condition is not ON, and deactivates the buffer 150 S28 and removes the CF memory 160 S29 if it is determined that the CF memory removal condition is ON, whereby the data logging is finished.

However, as explained above, the data log module 100 according to the prior art is problematic in that it cannot back up important data, because it cannot store the PLC inner data in the CF memory 160, in a case the CF memory 160 is removed. Another problem is that data can be backed up by attaching only one CF memory 160 on the data log module 100, such that in a case life of the CF memory 160 ceases or the CF memory 160 is broken, the data cannot be backed up. Still another problem of the data log module 100 according to the prior art is that the stored data of the CF memory 160 can be hardly reliable. Accordingly, there is room for improvement in the PLC data log module.

SUMMARY

The present disclosure has been made to solve the foregoing problems of the prior art and therefore an object of certain embodiments of the present invention is to provide a PLC data log module configured to install a large capacity flash memory inside the PLC data log module and to simultaneously attach a CF memory and a USB memory outside of the PLC data log module, whereby data can be stored even if a user remove the USB memory or the CF memory at a desired time, and a method for storing data in the PLC data log module.

In one general aspect of the present disclosure, there is provided a PLC (Programmable Logic Controller) data log module connected to a PLC basic module and attached with a plurality of outside storages for storing PLC log data, the data log module comprising: a temporary storage for temporarily storing the log data received from the basic module; a storage storing the log data in a predetermined file system; and a controller storing the log data in the outside storages, in a case one or more outside storages is attached, and storing the log data in the storage.

Preferably, but not necessarily, the outside storage includes a CF (Compact Flash) memory, and the data log module further comprises a buffer for separating the CF memory from an inner data bus.

Preferably, but not necessarily, the outside storage includes a USB memory, and the data log module further comprises a USB controller for supporting a host function of the USB memory.

Preferably, but not necessarily, the controller checks if the data is normally stored in the attached outside storage.

In another general aspect of the present disclosure, there is provided a method for storing data in a PLC data log module configured to store log data by being connected to a PLC basic module, to be formed therein with storage and to be attached a plurality of outside storages, the method comprising: storing the log data in the outside storages, in a case one or more outside storages is attached; and storing the log data in the storage.

Preferably, but not necessarily, the method further comprising checking if the log data is normally stored in the attached outside storage.

Preferably, but not necessarily, the method further comprises checking if a log data storage condition is generated.

Preferably, but not necessarily, the method further comprises storing the log data stored in the storage in the outside storage, in a case data to be stored in the attached outside storage is present as a result of check at the checking step.

Preferably, but not necessarily, the method further comprises removing the outside storage, in a case there is a removal request of the attached outside storage.

Preferably, but not necessarily, the method further comprises notifying an error of the attached outside storage, in a case data to be stored in the attached outside storage is absent as a result of check at the checking step.

The present disclosure has an advantageous effect in that data is tri-fold stored at storage of the data log module, a CF memory and a USB memory to enable a safe storage of data free from data loss, even if the CF memory or the USB memory is removed, whereby data reliability of PLC system can be secured.

BRIEF DESCRIPTION OF THE DRAWINGS

The drawing figures depict one or more exemplary embodiments in accord with the present concepts, by way of example only, not by way of limitations. In the figures, like reference numerals refer to the same or similar elements.

Thus, a wide variety of potential practical and useful embodiments will be more readily understood through the following detailed description of certain exemplary embodiments, with reference to the accompanying exemplary drawings in which:

FIGS. 4A and 4B are flowcharts illustrating a method for storing data in a PLC data log module according to an exemplary embodiment of the present disclosure.

DETAILED DESCRIPTION

Figure 1:
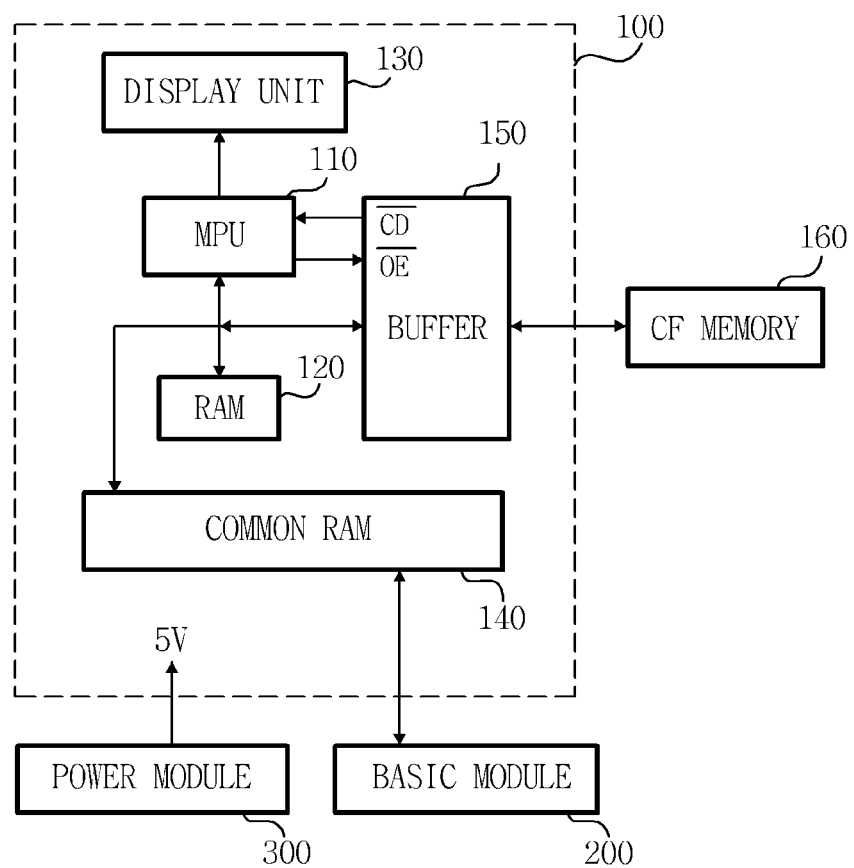
FIG. 1 is a block diagram illustrating a data log module according to prior art.
Figure 2:
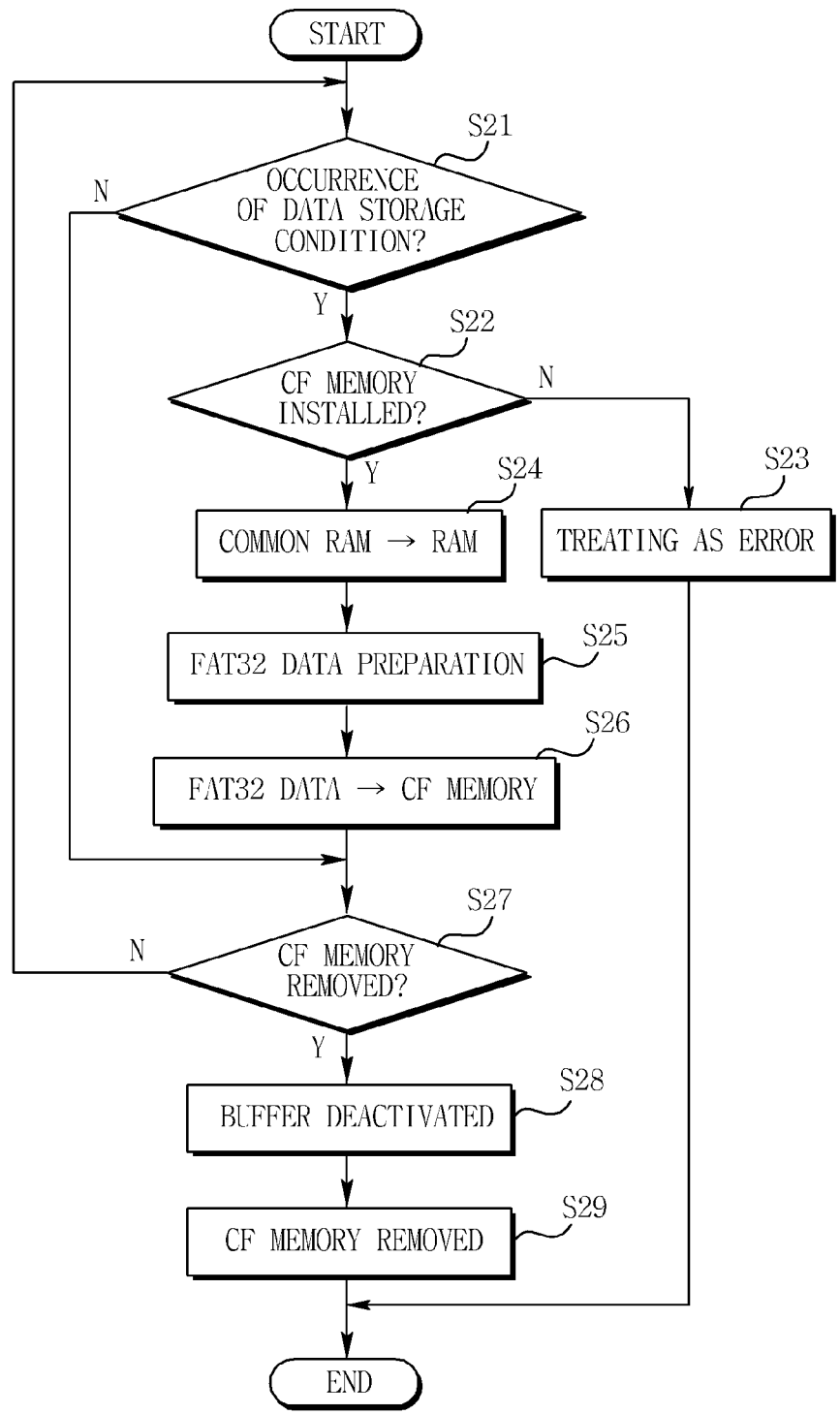
FIG. 2 is a flowchart of data storage method of data log module according to prior art.

The disclosed embodiments and advantages thereof are best understood by referring to FIGS. 1-4 of the drawings, like numerals being used for like and corresponding parts of the various drawings. Other features and advantages of the disclosed embodiments will be or will become apparent to one of ordinary skill in the art upon examination of the following figures and detailed description. It is intended that all such additional features and advantages be included within the scope of the disclosed embodiments, and protected by the accompanying drawings. Further, the illustrated figures are only exemplary and not intended to assert or imply any limitation with regard to the environment, architecture, or process in which different embodiments may be implemented. Accordingly, the described aspect is intended to embrace all such alterations, modifications, and variations that fall within the scope and novel idea of the present invention.

Meanwhile, the terminology used herein is for the purpose of describing particular implementations only and is not intended to be limiting of the present disclosure. The terms "first," "second," and the like, herein do not denote any order, quantity, or importance, but rather are used to distinguish one element from another. For example, a second constituent element may be denoted as a first constituent element without departing from the scope and spirit of the present disclosure, and similarly, a first constituent element may be denoted as a second constituent element.

As used herein, the terms "a" and "an" herein do not denote a limitation of quantity, but rather denote the presence of at least one of the referenced item. That is, as used herein, the singular forms "a", "an" and "the" are intended to include the plural forms as well, unless the context clearly indicates otherwise.

It will be understood that when an element is referred to as being "connected" or "coupled" to another element, it can be directly connected or coupled to the other element or intervening elements may be present. In contrast, when an element is referred to as being "directly connected" or "directly coupled" to another element, there are no intervening elements present.

It will be further understood that the terms "comprises" and/or "comprising," or "includes" and/or "including" when used in this specification, specify the presence of stated features, regions, integers, steps, operations, elements, and/or components, but do not preclude the presence or addition of one or more other features, regions, integers, steps, operations, elements, components, and/or groups thereof.

Also, "exemplary" is merely meant to mean an example, rather than the best. If is also to be appreciated that features, layers and/or elements depicted herein are illustrated with particular dimensions and/or orientations relative to one another for purposes of simplicity and ease of understanding, and that the actual dimensions and/or orientations may differ substantially from that illustrated.

That is, in the drawings, the size and relative sizes of layers, regions and/or other elements may be exaggerated or reduced for clarity. Like numbers refer to like elements throughout and explanations that duplicate one another will be omitted. As may be used herein, the terms "substantially" and "approximately" provide an industry-accepted tolerance for its corresponding term and/or relativity between items.

According to the present disclosure, a PLC log data is stored at every predetermined time, a series of operations are monitored, in a case a particular data becomes a set value, or a past history is stored to allow analyzing in advance what operation has been generated. To this end, easily attachable/detachable CF memory and USB memory are used to store data, and a tri-fold data backup system is formed to prevent data loss by being capable of storing data even if the CF memory and the USB memory are removed.

Hereinafter, the present disclosure will be described in detail with reference to the accompanying drawings.

Figure 3:
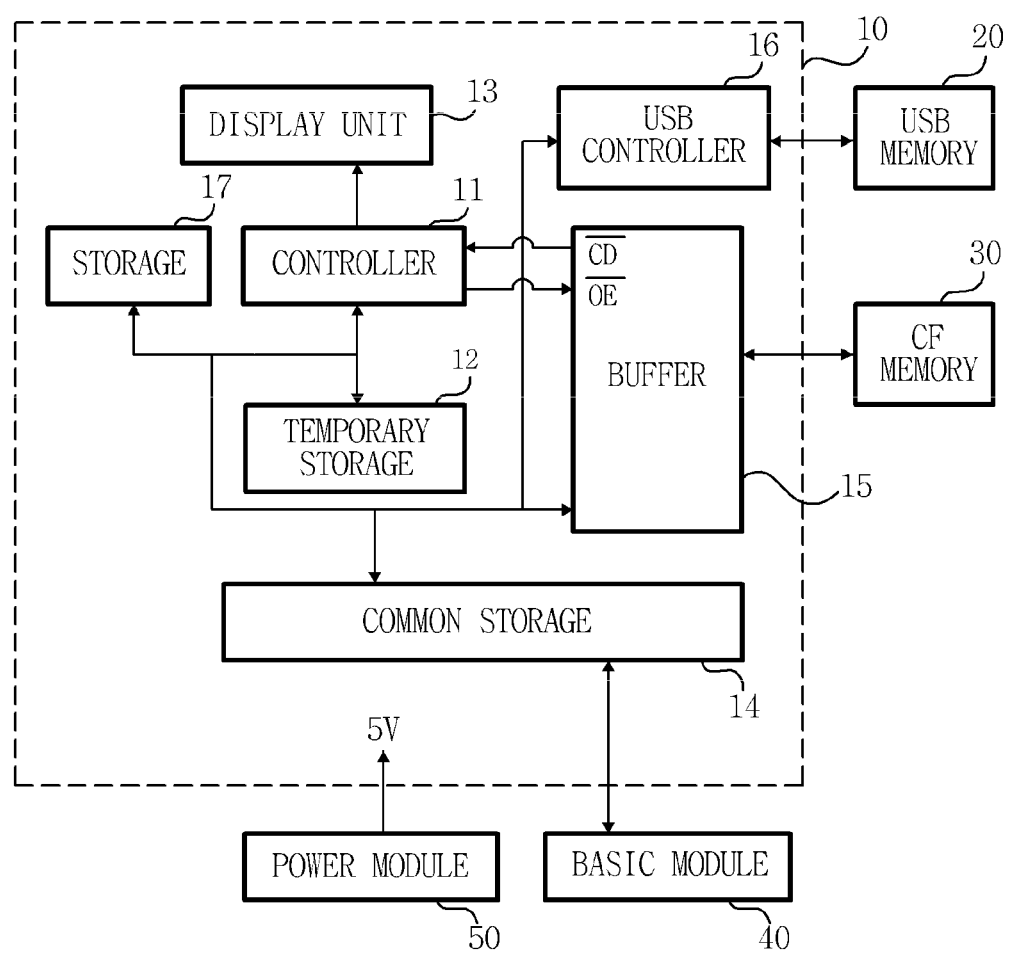
FIG. 3 is a block diagram illustrating a structure of a data log module according to an exemplary embodiment of the present disclosure.

FIG. 3 is a block diagram illustrating a structure of a PLC data log module according to an exemplary embodiment of the present disclosure.

In FIG. 3, a PLC data log module 10 is connected to a PLC basic module 40 and a power module 50. To be more specific, the PLC data log module 10 includes a controller 11, a temporary storage 12, a display unit 13, a common storage 14, a buffer 15, a USB controller 16 and storage 17.

Furthermore, the data log module 10 comprises a port capable of respectively attaching a USB memory 20 and a CF memory 30 permanently storing a preservation-required data in a predetermined file system structure (e.g., FAT32).

The basic module 40 reads out a parameter set up in the data log module 10 and transmits a relevant log data to the data log module 10. The power module 50 supplies a power required for operating the data log module 10.

The controller 11 functions to perform an entire control of the data log module 10. A detailed operation of controller 11 will be described later with reference to the accompanying drawings. The controller 11 may be an MPU (Micro Processor Unit), but it is not limited thereto.

The common storage 14 is a temporary storage element commonly used with the basic module 40 for data read and write, and temporarily stores the log data received from the basic module 40. That is, the common storage 14 takes care of interface with the basic module 40. The common storage 14 may be a dual port RAM (Random Access Memory), for example, but it is not limited thereto.

The temporary storage 12 temporarily stores the log data of basic module read by the common storage 14. The temporary storage 12 may be an RAM (Random Access Memory), but it is not limited thereto. The display unit 13 displays an operational state of the data log module 10. The display unit 13 may be constructed with an LED (Light Emitting Diode), but the display unit 13 is not limited thereto. The buffer 15 divides the CF memory 30 from an inner data bus. In the drawing, $\overline{CD}$ is a signal for checking whether the CF memory 30 is attached, and $\overline{OE}$ is a signal for removing the CF memory 30.

The USB controller 16 supports a USB host function for connection with the USB memory 20. The USB controller 16 may be an ASIC (Application Specific Integrated Circuit), but it should be apparent that the USB controller 16 is not limited to the ASIC. The storage 17 permanently stores the preservation-required data in a predetermined file system structure (e.g., FAT32). The storage 17 in the present disclosure is a flash memory, but it is not limited thereto, and the file system of the storage 17 is not limited to FAT32 either.

The data log module 10 according to the present disclosure is configured to always store data in the innate storage 17, even if the CF memory 30 or the USB memory 20 is not attached, in a case data storage condition is generated.

That is, in a case the CF memory 30 or the USB memory 20 is attached, the data is stored in the attached memory, and simultaneously the data is stored in the storage 17.

Figure 4B:
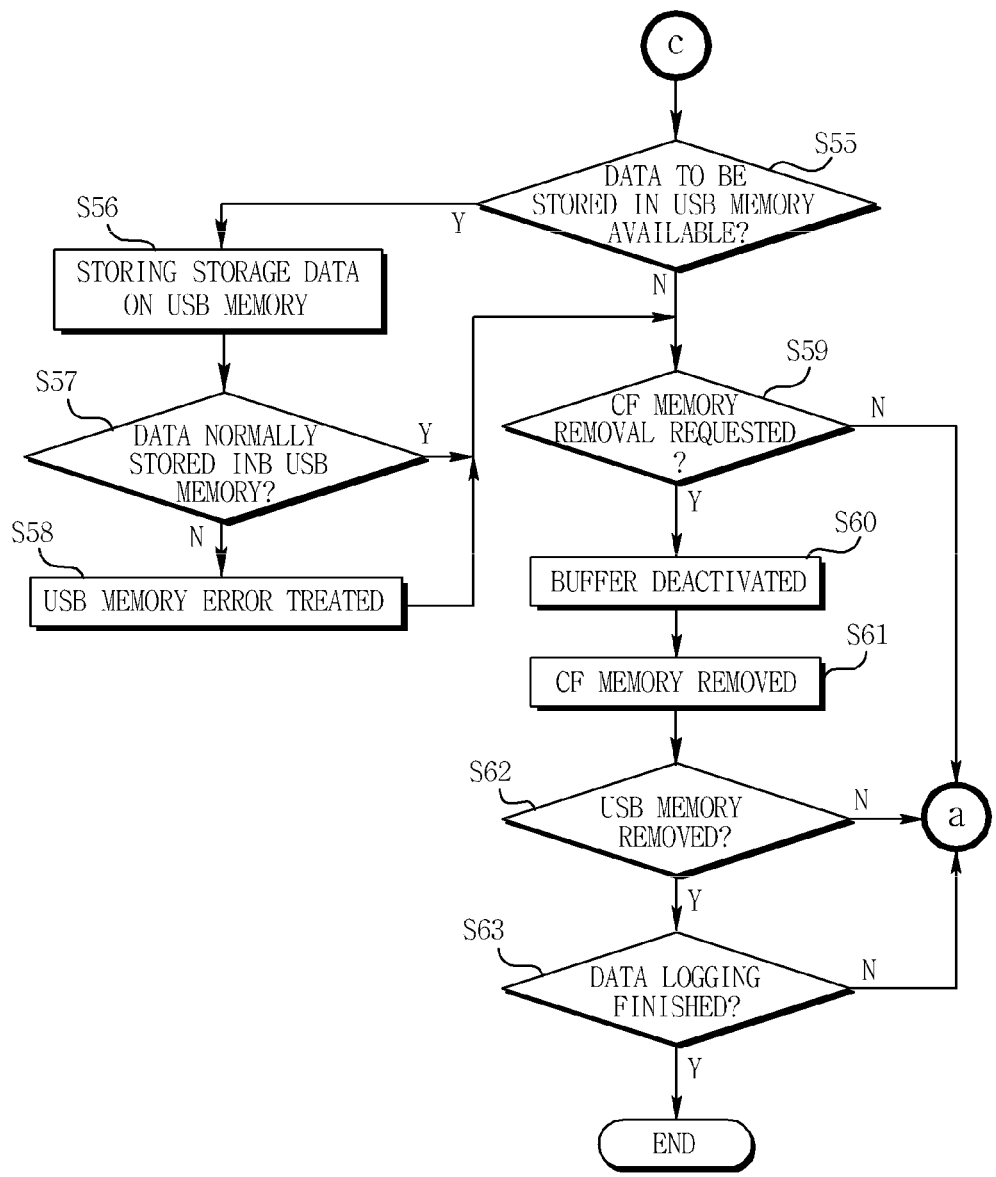

FIGS. 4A and 4B are flowcharts illustrating a method for storing data in a PLC data log module according to an exemplary embodiment of the present disclosure.

Referring to FIGS. 4A and 4B, the method is such that when a data logging starts, checking is made as to whether data storage condition is generated S41. If the storage condition is not generated, flow moves onto ⓑ.

In a case the data storage condition is generated, the data in the common storage 14 is moved to the temporary storage 12, S42, and the data is processed in a predetermined file system format (e.g., FAT32), S43. At this time, in a case the CF memory is attached, the buffer 15 is activated, S45 and store the processed data in the CF memory 30. In a case the CF memory 30 is not attached, S44 but the USB memory 20 is attached, the processed data is stored in the USB memory 20, S48. Furthermore, the data storing method according to the present disclosure stores the processed data in the storage 17 of the data log module 10, regardless of storage in the CF memory 30 and the USB memory 20, S49.

Successively, determination is made as to whether data is normally stored by checking into the data of the CF memory 30. That is, in a case data to be stored in the CF memory 30 is present, S50, the buffer 15 is re-activated, S51, and the data stored in the storage 17 is stored in the CF memory 30, S52. Furthermore, determination is made as to whether the data is normally stored in the CF memory 30, S53, and in a case the data is abnormally stored in the CF memory 30, the CF memory 30 is treated as an error S54.

Thereafter, check is made into the data of the USB memory 20 if the data is normally stored. In a case the data is not normally stored, that is, in a case the data to be stored in the USB memory 20 is present, S55, the data stored in the storage 17 is stored in the USB memory 20, S56. Determination is made as to whether the data is properly stored in the USB memory 20, S57, and the USB memory 20 is treated as an error in a case the data is not stored normally in the USB memory 20, S58.

The storing method according to the present disclosure is such that the buffer 15 checks if a removal signal relative to the CF memory 30 is ON, S59, and in a case the removal signal relative to the CF memory 30 is OFF, data logging is kept going on, and in a case the removal signal relative to the CF memory 30 is ON, the buffer 15 is deactivated S60 to remove the CF memory 30, S61.

Furthermore, the data storing method according to the present disclosure is such that determination is made as to whether USB memory 20 is removed, S62, and in a case the USB memory 20 is not removed, the data logging is kept going on, and in a case the USB memory 20 is removed, check is made as to whether data logging is finished S63 to end the data logging.

The data storing method according to the present disclosure is a process of checking whether a normal data is stored in the CF memory 30 at S50. In a case the CF memory 30 is normally attached and the data is normally stored, same operation S55 is performed relative to the USB memory 20, which is to store the data of storage 17 in the CF memory 30, in a case the CF memory 30 is attached while operation is performed under a state where the CF memory 30 is not attached. In a case the storage is finished, check is made as to whether the data is normally stored S53 to check whether there is generated an error.

In a case check to the CF memory 30 is finished, the same checking process is performed to the USB memory 20, S55. The USB memory 20 and the CF memory 30 are always attachable and detachable structure-wise, any missing data is stored and check is made by always performing the checking process after the data is stored in the storage 17.

In the present disclosure, in a case both the CF memory 30 and the USB memory 20 are all removed, the data is stored in the storage 17 only. However, in a case either the CF memory 30 or the USB memory 20 is attached, the logged data stored in the storage 17 can be directly stored in the USB memory 20 or the CF memory 30.

In the present disclosure, if a data logging stop command is received under a state of both the CF memory 30 and the USB memory 20 being all removed, the data logging is finished.

The PLC data log module and method for storing data in the same according to the present disclosure has an industrial applicability in that data is tri-fold stored at a storage 17 of the data log module, and the CF memory 30 and the USB memory 20 to enable a safe storage of data free from data loss, even if the CF memory 30 or the USB memory 20 is removed, whereby data reliability of PLC system can be secured.

Although the CF memory and a USB memory are exemplified and explained in the present disclosure as an outside storage for permanently storing log data of the data log module, the memories are not limited to the CF memory and the USB memory, and it should be well appreciated by skilled in the art that other types of memories can be utilized depending on development of technologies. It should be also apparent that the number of outside storage is not limited.

Although the present disclosure has been described with reference to a number of illustrative embodiments thereof, it should be understood that numerous other modifications and embodiments can be devised by those skilled in the art that will fall within the spirit and scope of the principles of this disclosure.

More particularly, various variations and modifications are possible in the component parts and/or arrangements of subject combination arrangement within the scope of the disclosure, the drawings and the appended claims. In addition to variations and modifications in the component parts and/or arrangements, alternative uses will also be apparent to those skilled in the art.

What is claimed is:

1. A PLC (Programmable Logic Controller) data log module connected to a PLC basic module and configured to be attached to an external storage for storing PLC log data, the data log module comprising:
    a temporary storage configured to temporarily store the PLC log data received from the basic module;
    an internal storage configured to store the PLC log data in a predetermined file system; and
    a controller configured to:
        determine if the external storage is electrically connected to the internal storage;
        whether or not the external storage is electrically connected to the internal storage,
            store the PLC log data in the internal storage, and
            repeatedly determine whether or not there is PLC log data in the internal storage that has not been stored in the external storage,
        when the external storage is electrically connected to the internal storage,
            attempt to store the PLC log data in the external storage;
            determine if the PLC log data was successfully stored in the external storage; and
            if it is determined that the PLC log data was not successfully stored in the external storage, re-attempt to store the PLC log data that was stored in the internal storage in the external storage.

2. The data log module of claim 1, wherein the external storage is a CF (Compact Flash) memory and further comprising a buffer configured to separate the CF memory from an inner data bus.

3. The data log module of claim 1, wherein the external storage is a USB memory and further comprising a USB controller configured to support a host function of the USB memory.

4. The data log module of claim 1, the controller is further configured to determine if a log data storage condition is generated.

5. The data log module of claim 1, wherein the controller is further configured to indicate an error if it is determined that the PLC log data was not successfully stored in the external storage.

6. A method for storing data in a PLC (Programmable Logic Controller) data log module connected to a PLC basic module, the data log module comprising an internal storage and configured to be electrically connected to an external storage, the method comprising:
    determining if the external storage is electrically connected to the internal storage;
    whether or not the external storage is electrically connected to the internal storage,
        storing PLC log data in the internal storage, and
        repeatedly determining whether or not there is PLC log data in the internal storage that has not been stored in the external storage,
    wherein the external storage is electrically connected to the internal storage,
        attempting to store the PLC log data in the external storage;
        determining if the PLC log data was successfully stored in the external storage; and
        if it is determined that the PLC log data was not successfully stored in the external storage, re-attempting to store the PLC log data that was stored in the internal storage in the external storage.

7. The method of claim 6, further comprising determining if a log data storage condition is generated.

8. The method of claim 6, further comprising removing the attached external storage if a removal request is received.

9. The method of claim 6, further comprising indicating an error if it is determined that the PLC log data was not successfully stored in the external storage.

10. The method of claim 6, wherein the external storage is a CF (Compact Flash) memory and further comprising separating the CF memory from an inner data bus.

11. The method of claim 6, wherein the external storage is a USB memory and further comprising supporting a host function of the USB memory.

* * * * *